United States Patent
Li et al.

(10) Patent No.: US 9,260,617 B2
(45) Date of Patent: Feb. 16, 2016

(54) INKJET INK COMPOSITION FOR PRINTING IRREMOVABLE TRACE MARKS ON SUBSTRATES FOR ENHANCING PRODUCT AUTHENTICITY AND TRACEABILITY

(71) Applicants: Pei Li, Hong Kong (CN); Kin Man Ho, Hong Kong (CN); Chun Ho Yam, Hong Kong (CN); Kwai Sang Ng, Hong Kong (CN); Siu Sun Chan, Hong Kong (CN)

(72) Inventors: Pei Li, Hong Kong (CN); Kin Man Ho, Hong Kong (CN); Chun Ho Yam, Hong Kong (CN); Kwai Sang Ng, Hong Kong (CN); Siu Sun Chan, Hong Kong (CN)

(73) Assignee: INNER MONGOLIA XIANHONG SCIENCE CO. LTD, Hohhot, Inner Mongolia (CN)

( * ) Notice: Subject to any disclaimer, the term of this patent is extended or adjusted under 35 U.S.C. 154(b) by 4 days.

(21) Appl. No.: 14/308,708

(22) Filed: Jun. 18, 2014

(65) Prior Publication Data
US 2014/0378585 A1  Dec. 25, 2014

Related U.S. Application Data

(60) Provisional application No. 61/837,378, filed on Jun. 20, 2013.

(51) Int. Cl.
| | | |
|---|---|---|
| *C09D 11/32* | (2014.01) | |
| *C08K 5/23* | (2006.01) | |
| *C08K 5/18* | (2006.01) | |
| *C08K 5/3432* | (2006.01) | |
| *C08K 5/07* | (2006.01) | |
| *C08K 5/10* | (2006.01) | |
| *C09D 11/322* | (2014.01) | |
| *C08K 5/41* | (2006.01) | |
| *C08K 5/3465* | (2006.01) | |
| *C09D 11/328* | (2014.01) | |

(52) U.S. Cl.
CPC ............... *C09D 11/322* (2013.01); *C08K 5/18* (2013.01); *C08K 5/235* (2013.01); *C08K 5/3465* (2013.01); *C08K 5/41* (2013.01); *C09D 11/328* (2013.01)

(58) Field of Classification Search
USPC ............ 106/31.28, 31.4, 31.41, 31.72, 31.75, 106/31.88
See application file for complete search history.

(56) References Cited

U.S. PATENT DOCUMENTS

| | | | |
|---|---|---|---|
| 5,449,400 A | | 9/1995 | Van Lint et al. |
| 5,700,534 A * | | 12/1997 | Shibazaki et al. ......... 428/36.92 |
| 5,847,024 A | | 12/1998 | Newman et al. |
| 7,081,158 B2 | | 7/2006 | Sabys et al. |
| 7,297,201 B2 | | 11/2007 | Looman et al. |
| 7,833,334 B2 | | 11/2010 | de Saint-Romain |
| 8,282,724 B2 | | 10/2012 | Goustiaux et al. |

FOREIGN PATENT DOCUMENTS

EP  0807148 B1  7/1999

* cited by examiner

*Primary Examiner* — Vu A Nguyen
(74) *Attorney, Agent, or Firm* — Kam. W. Law; Squire Patton Boggs

(57) ABSTRACT

Provided herein is an inkjet ink composition for printing irremovable color trace marks on polymer substrates. The composition disclosed herein comprises a surface colorant, a hydrophobic colorant capable of staining the polymer substrates disclosed herein, a hydrophobic colorant carrier which provides good solubility for the hydrophobic colorant, a binder and an ink solvent system. Printing with the composition disclosed herein on multilayered plastic packaging provides a double layered print. The surface colorants can be removed by an organic solvent, while the hydrophobic colorant can stain the nonporous substrates, giving a watermark of the surface print or an inner layer trace marks, which are highly resistance against chemical and physical stress. The composition disclosed herein also allows color tuning of the trace marks. Attempt to remove the printed information by any physical or chemical means will leave irremovable color trace marks, thus allowing consumers to detect tampered goods.

19 Claims, No Drawings

INKJET INK COMPOSITION FOR PRINTING IRREMOVABLE TRACE MARKS ON SUBSTRATES FOR ENHANCING PRODUCT AUTHENTICITY AND TRACEABILITY

PRIOR RELATED APPLICATIONS

This application claims the benefit under 35 U.S.C. §119(e) of U.S. Provisional Patent Application No. 61/837,378, filed on Jun. 20, 2013, which is incorporated herein by reference in its entirety.

FIELD OF THE INVENTION

This invention provides an inkjet ink composition for printing irremovable color trace marks on substrates such as polymer substrates which may be nonporous and/or hydrophobic. The inkjet ink composition disclosed herein comprises a surface colorant which may be one or more dyes and/or pigments, a hydrophobic colorant capable of staining the polymer substrates disclosed herein, a hydrophobic colorant carrier which provides good solubility for the hydrophobic colorant, a binder, an ink solvent system and one or more optional additives.

BACKGROUND OF THE INVENTION

Inkjet printing is a well-known technique for printing or marking information (e.g., manufacturing and/or expiration dates, lot numbers, manufacturing locations, etc.) or images on packages of consumer products such as dairy products, beverages, snacks, food products, plastic bottles, PVC pipes, electrical wirings, etc. Such markings provide manufacturers with useful information for tracking products from their production lines to retail locations where they are being sold to consumers. Product traceability is an important issue in protecting public health and managing supply chain because it allows a manufacturer or public agency to quickly and accurately identify any contaminated goods, and then remove them from the marketplace.

In recent years, the spread of counterfeit goods and the number of infringing goods increase significantly. Reselling of spoiled or lost inventory and contaminated products also happens frequently, thus threatening public health. One of the causes of these issues is attributed to the fact that current markings on packaging printed by inkjet printing technology are not permanent. The marks can be easily removed by either physical or chemical methods. In fact, this is a well-known and a long standing problem to the industries for products with markings on plastic surfaces. Therefore, in order to protect the product information and provide product traceability, there is an urgent need to develop printing systems that are capable of printing irremovable or indelible markings on plastic-based packaging materials.

To tackle the counterfeit issue, a range of anti-counterfeit technologies have been developed up to now. For pharmaceutical industries, well-known and widely used anti-counterfeit technologies include holograms and radio-frequency identification (RFID). However, holograms techniques can be easily reproduced and counterfeited. Nowadays, the RFID technologies are regarded as the most promising technologies for trace and track of the pallets and packages. The sophisticated RFID system allows tracing and securing the pharmaceutical supply chain. However, RFID still cannot prevent package tampering and intelligent hacking. Furthermore, RFID technologies are very expensive to be applied to those fast moving consumer goods (FMCG) such as dairy products, beverages, and food products. Therefore, there is a great demand for an affordable and reliable anti-counterfeiting technique for FMCG packaging.

In last decade, indelible inkjet ink formulations have been scarcely developed and used in printing codes or markings of industrial products from high speed production line with the "continuous inkjet" (CIJ) printing technology. For example, U.S. Pat. No. 5,449,400 has disclosed an anti-counterfeiting ink composition for invalidating bank notes or similar valuables by staining them permanently.

U.S. Pat. No. 5,847,024 has described an anti-counterfeiting non-yellowing watermark ink on papers.

U.S. Pat. No. 7,297,201 has described an inkjet ink composition that forms indelible images on porous or semi-porous substrate such as paper or postage stamps. The inkjet ink composition comprises (i) a hydrophobic colorant carrier, (ii) a first colorant that is soluble in the carrier; (iii) a second colorant comprising a pigment, which is dispersed in the carrier. The solubility difference between different colorants makes the resulting marks highly resistance against any chemical attacks.

U.S. Pat. No. 7,081,158 has disclosed an ink formulation containing more than 70% by weight of propylene carbonate as a solvent. The ink formulation has a high penetration capacity on paper substrates such as letters and postal articles. Propylene carbonate functions as a penetrant to carry the dyes passing through the substrate into inner layer of the substrate. The substrate then serves as a barrier to endow the penetrated dyes with good resistance to any physical and chemical stress.

U.S. Pat. No. 7,833,334 has disclosed an improved propylene carbonate-based ink formulation based on the U.S. Pat. No. 7,081,158. The formulation renders its good adhesion ability and extends its application to various substrates, such as, metal, plastics, glass, etc.

To address the moisture sensitive issue of the propylene carbonate-based ink, U.S. Pat. No. 8,282,724 has disclosed a water-free ink composition, wherein the inkjet ink composition contains organic compounds that are capable of dissociating the ionizable species. The presence of these ionizable species overcomes the problem of low ink conductivity arising from the absence of water for dissolving the conductive salt.

All of the inkjet ink compositions disclosed by the above patent references are mainly for printing indelible or anti-counterfeit markings on paper and postage stamps. They are not for printing indelible or anti-counterfeit markings on non-porous polymer substrates, such as low density poly(ethylene), high density poly(ethylene), poly(phenyl ether), polyolefin, poly(propylene), ethylene-vinyl acetate copolymers, epoxy resins, and the like. As mentioned earlier, the marks produced by the current inkjet ink can be easily removed by either physical or chemical methods.

It is one of the objectives of the present invention to overcome the disadvantages and problems mentioned above.

SUMMARY OF THE INVENTION

The aforementioned needs are met by various aspects disclosed herein. In one aspect, provided herein is an inkjet ink composition for printing one or more irremovable color trace marks on a nonporous polymer substrate, wherein the inkjet ink composition comprises a surface colorant, a hydrophobic colorant, a hydrophobic colorant carrier, an ink solvent, a binder, and an additive. In some embodiments, the hydrophobic colorant has a solubility higher than 0.2 g/100 mL of the hydrophobic colorant carrier.

In certain embodiments, the surface colorant comprises a metal complex dye, a pigment-based colorant or a combination thereof. In some embodiments, the surface colorant is present in an amount from 0.1% to 10% by weight, based on the total weight of the inkjet ink composition.

In some embodiments, the hydrophobic colorant comprises one or more nonionic hydrophobic colorants. In certain embodiments, the hydrophobic colorant is selected from the group consisting of anthraquinone-based colorants, azo-based colorants and combinations thereof. In further embodiments, the hydrophobic colorant is selected from the group consisting of C.I. solvent dyes and C. I. disperse dyes, and combinations thereof. In certain embodiments, the hydrophobic colorant is in an amount from 0.1% to 10% by weight, based on the total weight of the inkjet ink composition.

In certain embodiments, the hydrophobic colorant carrier comprises one or more organic solvents wherein the hydrophobic colorant has a solubility higher than 0.3 g/100 mL or higher than 0.5 g/100 mL of the one or more organic solvents. In some embodiments, the hydrophobic colorant carrier comprises one or more organic solvents, wherein the hydrophobic colorant remains soluble in the one or more organic solvents during drying and film forming process, and wherein the mobility of the hydrophobic colorant facilitates color staining of nonporous substrates. In some embodiments, the one or more organic solvents have a vapor pressure of less than 10 kPa or less than 3 kPa. In certain embodiments, the hydrophobic colorant carrier is present in an amount from 3% to 30% by weight or from 5% to 15% by weight, based on the total weight of the inkjet ink composition. In further embodiments, the one or more organic solvents comprise a mixture of cyclohexanone, acetophenone and quinoline.

In some embodiments, the ink solvent is selected from the group consisting of ketones, alcohols, esters, and combinations thereof. In certain embodiments, the ink solvent is a mixture of methyl ethyl ketone, ethanol and ethyl acetate. In further embodiments, the ink solvent is present in an amount from 50% to 85% by weight, or from 65% to 80% by weight, based on the total weight of the inkjet ink composition.

In certain embodiments, the hydrophobic colorant comprises a fluorescent dye or a rare earth element for security marking.

In some embodiments, the binder resin is present in an amount from 0.1% to 35% by weight, based on the total weight of the inkjet ink composition. In certain embodiments, the inkjet ink composition further comprises one or more plasticizers for solubilizing the binder resin.

In certain embodiments, the additive is selected from the group consisting of surfactants, light stabilizers, defoaming agents, antioxidants, UV stabilizers, bactericides, conducting agents, rub resistance agents, and combinations thereof.

In some embodiments, the inkjet ink formulation is suitable for producing a double layered print on the nonporous polymer substrate, wherein the double layered print comprises a surface print and a bottom print. In certain embodiments, the surface colorant is removable by an organic solvent, and wherein the hydrophobic colorant of the bottom layer is irremovable by the organic solvent.

In certain embodiments, the hydrophobic colorant stains the nonporous polymer substrate to form the one or more irremovable color trace marks, and is impervious to any chemical and physical alternations. In some embodiments, the color of the one or more irremovable color trace marks is same as or different from the color of the surface print. In further embodiments, the color of the one or more irremovable color trace marks is selected from the group consisting of red, yellow, orange, green, blue, black, and combinations thereof.

In some embodiments, the nonporous polymer substrate is selected from the group consisting of polyolefins such as low density poly(ethylene), high density poly(ethylene), and poly(propylene); ethylene-vinyl acetate copolymers; polyethers such as poly(phenyl ether); styrenics polymers such as polystyrene, poly(methyl styrene); polyacrylates such as poly(methyl methacrylate), poly(butyl methacrylate); chlorinated polymers such as poly(vinyl chloride), poly(vinylidene chloride); polycarbonates; epoxy resins and combinations thereof.

DETAILED DESCRIPTION OF THE INVENTION

General Definitions

The term "colorant" refers to a substance used for coloring a material. In some embodiments, the colorant is a dye, a pigment or a combination thereof.

The term "surface colorant" in an ink composition disclosed herein refers to a colorant that stays near or at the surface of a print mark formed by printing with the inkjet ink composition and then drying.

The term "bottom colorant" in an ink composition disclosed herein refers to a colorant that stays near or in the bottom of a print mark formed by printing with the inkjet ink composition and then drying.

The term "dye" refers to a colorant that is generally soluble in water or an organic solvent. The dye can be a natural dye or a synthetic dye. The natural dyes generally is derived from plant sources such as roots, berries, bark, leaves, and wood, fungi, and lichens. Some non-limiting examples of nature dye include woad, indigo, saffron, and madder. The synthetic dye generally is prepared chemically. Some non-limiting examples of synthetic dye include acid dyes, basic dyes, mordant dyes, vat dyes, reactive dyes, disperse dyes, sulfur dyes.

The term "pigment" or "pigment-based colorant" refers to a colorant that is generally insoluble in water or an organic solvent. Generally, a pigment has a high tinting strength relative to the material that it colors, and is stable in solid form at ambient temperatures. Some non-limiting examples of pigment include metal-based pigments; carbon pigments such as carbon black and ivory black pigments; clay earth pigments such as yellow ochre, raw sienna, burnt sienna, raw umber, burnt umber; and ultramarine pigments such as ultramarine and ultramarine green shade. Some non-limiting examples of metal-based pigments include cadmium pigments, chromium pigments, cobalt pigments, copper pigments, iron oxide pigments, lead pigments, manganese pigments, mercury pigments, titanium pigments, and zinc pigments The term "hydrophobic colorant" refers to a colorant that is insoluble in water. In some embodiments, the hydrophobic colorant is soluble in an organic solvent or a hydrophobic colorant carrier.

The term "nonionic hydrophobic colorant" refers to a hydrophobic colorant that is nonionic.

The term "hydrophobic colorant carrier" refers to a chemical wherein the hydrophobic colorant has a solubility higher than 0.1 g/100 mL, higher than 0.2 g/100 mL, higher than 0.25 g/100 mL, higher than 0.3 g/100 mL, higher than 0.4 g/100 mL, higher than 0.5 g/100 mL, higher than 0.6 g/100 mL, higher than 0.7 g/100 mL, higher than 0.8 g/100 mL, higher than 0.9 g/100 mL or higher than 1.0 g/100 mL of the chemical. In some embodiments, the hydrophobic colorant carrier comprises one or more organic solvents.

The term "metal complex dye" refers to a premetalised dye, in which one or more dye molecules are coordinated with a metal ion. The dye molecule can be any dye containing one or more functional groups such as hydroxy, carboxy, sulfonate, or amino, which are capable of forming a coordination complex with the metal ion. The metal ion can be derived from any transitional metal such as chromium, cobalt, nickel and copper. In some embodiments, the metal complex dye is a 1:1 metal complex dye or 1:2 metal complex dye or a combination thereof. A 1:1 metal complex dye refers to a dye where one metal ion is coordinated with one dye molecule disclosed herein. A 1:2 metal complex dye refers to a dye where one metal ion is coordinated with two dye molecule disclosed herein.

The term "fluorescent dye" refers to a dye that emits light after excitation by light. The wavelength of the emitted light is generally longer than that of the incident light.

The term "double layered print" refers to a printed mark that comprises a top print and a bottom print wherein the printed mark is formed concurrently by printing with an ink composition disclosed herein and then drying.

The term "trace mark" refers to the bottom print of the double layered print.

The term "irremovable trace mark" refers to a trace mark that has less than 20%, less than 15%, less than 10%, less than 5%, less than 4%, less than 3%, less than 2%, less than 1%, less than 0.5%, or less than 0.1% change in the optical density of the trace mark after the trace mark is rubbed 25 times with a cotton rod soaking with either an aqueous liquid or organic solvent. In some embodiments, the change in optical density of the trace mark before and after the rubbing can be observed by unaided eye under an inspection site with light illumination at room temperature. In certain embodiments, the change in optical density of the trace mark before and after the rubbing can be measured by a spectrophotometer using one or more wavelengths between 400 nm and 800 nm.

The term "polymer substrate" refers to a substrate comprises of a polymer such as a plastic or a thermoplastic or a thermoset or an elastomer. The term "plastic" or "thermoplastic" refers to a polymer that becomes pliable or moldable above a specific temperature and returns to a solid state upon cooling. Some non-limiting examples of plastic include polyolefins (such as polyethylene (PE), polypropylene (PP), polymethylpentene (PMP), polybutene-1), polyamides, polyesters, polycarbonates, polyacrylates, polymethacrylates, polystyrene, polybenzimidazole, halogenated plastic (such as polyvinylidene chloride, polyvinyl chloride, polytetrafluoroethylene). Any pliable thermoset or elastomer can be used herein. In some embodiments, the polymer is selected from the group consisting of thermoplastics, thermosets, elastomers and combinations thereof. In some embodiments, the polymer comprises one or more thermoplastics.

The term "nonporous polymer substrate" refers to polymer substrate that has a porosity or void fraction less than 0.3, less than 0.25, less than 0.2, less than 0.15, less than 0.1, less than 0.05, less than 0.04, less than 0.03, less than 0.02, or less than 0.01. The porosity or void fraction of a material refers to a fraction of the volume of voids over the total volume of the material.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

The present invention provides an inkjet ink composition for printing irremovable color trace marks on a nonporous polymer substrate or a hydrophobic substrate. The inkjet ink composition contains one or more dyes and/or pigments as a surface colorant, a hydrophobic colorant capable of staining the hydrophobic substrate, a hydrophobic colorant carrier which provides good solubility for or can dissolve the hydrophobic colorant, a binder, an ink solvent system, and one or more optional additives.

Printing with the inkjet ink composition disclosed herein on multi-layered plastic packaging can provide a double layered print comprising a top print and a bottom print. A substantial portion of the surface colorant resides in the top print, whereas a substantial portion of the hydrophobic colorant resides in the bottom print. The term "substantial portion" of a colorant refers to a portion greater than 99.9%, greater than 99.5%, greater than 99%, greater than 95%, greater than 90%, greater than 85%, greater than 80%, greater than 75%, greater than 70%, greater than 65%, greater than 60%, greater than 55%, or greater than 50%, based on the total volume or weight of the colorant. The surface colorant in the top print can be removed by a solvent, while the hydrophobic colorant stained on nonporous substrate, giving a trace mark that is highly resistance against chemical and physical stress. The composition of the present invention also allows color tuning of the trace mark. Attempts to remove the printed information on the plastic surface by any physical or chemical means will leave irremovable color trace marks, thus allowing consumers to detect tampered goods.

Generally, conventional ink compositions may comprise one or more dyes and/or pigments, a binder, a solvent or solvent mixture. However, all of the conventional ink compositions have never possessed an important relation between the hydrophobic colorant and a liquid which enables effectively staining nonporous substrates such as polyethylene by the hydrophobic colorant. In particular, no prior art document describes an ink that has a double layered printing feature, wherein the hydrophobic colorant forms trace mark that is overlaid by a surface colorant. The bottom trace marks are highly resistant to physical or chemical stress. Furthermore, no prior art documents have mentioned the double layered print feature with a possible selection of tracing color, thus ensuring product authenticity.

Furthermore, the present invention does not follow in obvious manner of the choice of the hydrophobic colorants and the hydrophobic colorant carriers. The present invention therefore overcomes the problems associated with prior arts as mentioned above.

The inkjet ink formulation disclosed herein can be applied to a nonporous surface using a continuous inkjet printer, such as Domino A series and Leibinger Jet 2 series. The inkjet ink composition can be used for printing a black and/or any color marking on the nonporous surface such as a variety of plastic packaging substrates. The irremovable tracing marks are clearly visible after removing the top marks with an organic solvent. The resulting color trace marks appear within 24 hours after printing, and possess good resistance to any physical and chemical stresses. Furthermore, unlike prior art suffering from slow drying rate and poor rub resistance due to the use of a high boiling solvent as a penetrant, the inkjet ink composition of the present invention possesses fast setting and good adhesion ability on the surfaces of nonporous polymer substrates, in particularly, polyolefins such as polyethylene (PE) or polypropylene (PP), or of any other nonporous or porous substance or composite of a plurality of the foregoing materials.

The inkjet ink composition disclosed herein comprises:

i) one or more surface colorants in an amount from 0.01% to 30%, from 0.05% to 20%, from 0.1% to 10%, or from 0.5% to 5% by weight;

ii) one or more hydrophobic colorants in an amount from 0.01% to 30%, from 0.05% to 20%, from 0.1% to 10%, or from 0.5% to 5% by weight;

iii) one or more hydrophobic colorant carriers in an amount from 1% to 50%, from 2% to 40%, from 3% to 35%, from 5% to 30%, or from 5% to 20% by weight;

iv) one or more ink solvents in an amount from 30% to 90%, from 40% to 85%, from 50% to 85%, from 50% to 80%, or from 50% to 70% by weight; and v) one or more binder resins in an amount from 0.1% to 50%, from 0.1% to 40%, from 0.1% to 35%, from 0.5% to 30%, from 1% to 25%, from 2% to 20%, or from 3% to 15% by weight. All weight % values are based on the total weight of the inkjet ink composition. In some embodiments, the inkjet ink composition further comprises one or more additives.

In some embodiments, the inkjet ink compositions disclosed herein have viscosities ranging from 2 mPa·s to 10 mPa·s. In certain embodiments, the inkjet ink compositions disclosed herein have electrical conductivities generally higher than 300 µS/cm at 20° C.

The function of the surface colorants is to provide visible surface markings or top print on substrates. The surface colorants can be either metal complex dyes or pigment-based colorants, or mixtures thereof. A combination of one or more metal complex dyes may also be used. In some embodiments, the amount of the surface colorant is less than 30%, less than 20%, less than 15%, less than 10%, less than 8%, less than 6%, or less than 5% by weight, based on the total weight of the inkjet ink composition.

Some non-limiting examples of metal complex dyes include Solvent Black 7, Solvent Black 27, Solvent Black 28, Solvent Black 29; Solvent Orange 45, Solvent Orange 54, Solvent Orange 62; Solvent Yellow 25, Solvent Yellow 79; Solvent Red 118, Solvent Red 119, Solvent Red 122, Solvent Red 125, Solvent Red 127, Solvent Red 130, Solvent Red 160, and Solvent Red 233.

Some non-limiting examples of pigment-based colorants include Pigment Black 7, Pigment Black 23, Pigment Black 28; Pigment Brown 6, Pigment Brown 23, Pigment Brown 24; Pigment Blue 15:1, Pigment Blue 28, Pigment Blue 29, Pigment Blue 36, Pigment Blue 72, Pigment Blue 76; Pigment Green 7, Pigment Green 17, Pigment Green 36, Pigment Green 50; Pigment Violet 2, Pigment Violet 19, Pigment Violet 23; Pigment Red 5, Pigment Red 48:2, Pigment Red 52, Pigment Red 52:2, Pigment Red 57:1, Pigment Red 81, Pigment Red 111, Pigment Red 112, Pigment Red 122, Pigment Red 135, Pigment Red 144, Pigment Red 149, Pigment Red 166, Pigment Red 170, Pigment Red 179, Pigment Red 181, Pigment Red 187, Pigment Red 202, Pigment Red 209, Pigment Red 220, Pigment Red 221, Pigment Red 247, Pigment Red 254, Pigment Red 272; Pigment Orange 13, Pigment Orange 16, Pigment Orange 43, Pigment Orange 60, Pigment Orange 64, Pigment Orange 71; Pigment Yellow 1, Pigment Yellow 13, Pigment Yellow 14, Pigment Yellow 42, Pigment Yellow 53, Pigment Yellow 63, Pigment Yellow 65, Pigment Yellow 83, Pigment Yellow 93, Pigment Yellow 95, Pigment Yellow 109, Pigment Yellow 110, Pigment Yellow 119, Pigment Yellow 138, Pigment Yellow 151, Pigment Yellow 168, Pigment Yellow 180, Pigment Yellow 183, Pigment Yellow 191, and Pigment Yellow 232.

The hydrophobic colorants are used to provide staining on nonporous hydrophobic surface through hydrophobic interaction. In some embodiments, the hydrophobic colorants are nonionic and are selected from the group consisting of anthraquinone-based colorants, azo-based colorants and combinations thereof. Some non-limiting examples of hydrophobic colorants include C. I. Solvent dyes and C. I. Disperse dyes. A combination of one or more hydrophobic colorants may be used to generate different colors of trace marks. In some embodiments, the amount of the hydrophobic colorant is less than 30%, less than 20%, less than 15%, less than 10%, less than 8%, less than 6%, or less than 5% by weight, based on the total weight of the inkjet ink composition.

Some non-limiting examples of C. I. Solvent dyes are Solvent Black 3; Solvent blue 3, Solvent Blue 4, Solvent Blue 35, Solvent Blue 36, Solvent Blue 45, Solvent Blue 59, Solvent Blue 63, Solvent Blue 67, Solvent Blue 68, Solvent Blue 70, Solvent Blue 78, Solvent Blue 94, Solvent Blue 97, Solvent Blue 101, Solvent Blue 104; Solvent Violet 13, Solvent Violet 36, Solvent Violet 37; Solvent Green 3, Solvent Green 5, Solvent Green 20, Solvent Green 28, Solvent Green 33; Solvent Orange 60, Solvent Orange 86; Solvent Yellow 14, Solvent Yellow 33, Solvent Yellow 56, Solvent Yellow 124; Solvent Red 8, Solvent Red 23, Solvent Red 24, Solvent Red 25, Solvent Red 111, and Solvent Red 135.

Some non-limiting examples of C. I. Disperse dyes are Disperse Black 3; Disperse Blue 3, Disperse Blue 60, Disperse Blue 73, Disperse Blue 79; Disperse Violet 4, Disperse Violet 26, Disperse Violet 33; Disperse Orange 25, Disperse Orange 29; Disperse Yellow 3, Disperse Yellow 54, Disperse Yellow 64, Disperse Yellow 211; Disperse Red 15, Disperse Red 60, and Disperse Red 167.

The hydrophobic colorant carrier can be used to improve solubility for hydrophobic colorants. In some embodiments, the solubility of a specific colorant in the hydrophobic colorant carrier is more than 0.3 g/100 mL. In other embodiments, the solubility of a specific colorant in the hydrophobic colorant carrier is more than 0.5 g/100 mL. In certain embodiments, the hydrophobic colorant carrier has a vapor pressure (VP) of less than 10 kPa, less than 9 kPa, less than 8 kPa, less than 7 kPa, less than 6 kPa, less than 5 kPa, less than 4 kPa, less than 3 kPa, less than 2 kPa, or less than 1 kPa, in order to ensure hydrophobic colorants remain soluble during drying and film forming process. This is particularly important to remain the high mobility of hydrophobic colorants, which provides sufficient time for staining the nonporous substrates.

The hydrophobic colorant carrier disclosed herein may comprise one or more solvents or mixtures thereof in order to ensure the good solubility and retardation of drying for hydrophobic colorants. The choice of the hydrophobic colorant carrier depends on the nature of hydrophobic colorants. Some non-limiting examples of the hydrophobic colorant carrier include cyclohexanone, N-methyl pyrrolidone, 2-pyrrolidone, quinoline, pyridine, vinyl pyridine, dimethyl formamide, dimethyl acetate, m-cresol, 2-chlorophenol, tetrachloroethane, benzene, toluene, and the like.

Other non-limiting examples of the hydrophobic colorant carrier include ketone solvents, acetate solvents, the propionate esters, and carbonate solvents. Some non-limiting examples of the ketone solvents include methyl propyl ketone, methyl isobutyl ketone, ethyl propyl ketone, diisobutyl ketone, acetophenone, and the like. Some non-limiting examples of the acetate solvents include butyl acetate, isobutyl acetate, penta(amyl) acetate, and the like. Some non-limiting examples of the propionate esters such as n-butyl propionate, n-pentyl propionate and ethylene glycol monoethylether propionate are also suitable. Some non-limiting examples of the carbonate solvents comprise dimethyl carbonate, diethyl carbonate, ethylene carbonate, propylene carbonate, and the like. Other types of solvents which can dissolve the hydrophobic colorants or in combination with other solvents disclosed herein can also be used. In some embodiments, the hydrophobic colorant carrier is present in an amount from about 3% to 30% by weight or volume, or from 5% to 15% by weight or volume, based on the total weight or volume of the inkjet ink composition.

In certain embodiments, the amount of the hydrophobic colorant carrier is at least 1%, at least 2%, at least 3%, at least 4%, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% by weight or volume, based on the total weight or volume of the inkjet ink composition. In some embodiments, the amount of the hydrophobic colorant carrier is at most 1%, at most 2%, at most 3%, at most 4%, at most 5%, at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90%, or at most 95% by weight or volume, based on the total weight or volume of the inkjet ink composition.

In one embodiment, the hydrophobic colorant carrier is a mixture of cyclohexanone (VP=0.45 kPa), acetophenone (VP=0.05 kPa), and quinoline (VP=0.0012 kPa). In certain embodiments, the amount of each of cyclohexanone, acetophenone, and quinoline is independently at least 1%, at least 2%, at least 3%, at least 4%, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% by weight or volume, based on the total weight or volume of the mixture of cyclohexanone, acetophenone, and quinoline. In some embodiments, the amount of each of cyclohexanone, acetophenone, and quinoline is independently at most 1%, at most 2%, at most 3%, at most 4%, at most 5%, at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90%, or at most 95% by weight or volume, based on the total weight or volume of the mixture of cyclohexanone, acetophenone, and quinoline.

The ink solvent of the inkjet ink composition disclosed herein may comprise one or two or more solvents. In some embodiments, the ink solvent comprises a volatile solvent, a nonvolatile solvent or a combination thereof. In certain embodiments, the volatile solvent is the major component which provides ink with rapid drying properties and good solubility for surface colorants. The term "major component" refers to the component that is more than least 50%, more than 55%, more than 60%, more than 65%, more than 70%, more than 75%, more than 80%, more than 85%, more than 90%, or more than 95% by weight or volume, based on the total weight or volume of the ink solvent.

In some embodiments, the amount of the ink solvent is at least 1%, at least 2%, at least 3%, at least 4%, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% by weight or volume, based on the total weight or volume of the inkjet ink composition. In some embodiments, the amount of the ink solvent is at most 1%, at most 2%, at most 3%, at most 4%, at most 5%, at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90%, or at most 95% by weight or volume, based on the total weight or volume of the inkjet ink composition.

Some non-limiting examples of the volatile solvent include lower alkanols containing 1 to 3 carbon atoms, such as methanol, ethanol, propanol, etc.; lower aliphatic ketones, such as acetone, dimethyl ketone, methyl ethyl ketone, etc.; other solvents such as ethyl acetate, isopropyl acetate, propyl acetate; and combinations thereof. In certain embodiments, the volatile solvent component is methyl ethyl ketone, ethanol, ethyl acetate or a combination thereof.

The composition of the ink solvent further allows tuning the drying rate of the ink and adjusting the solution viscosity to any desired range, such as from 2 mPa·s to 10 mPa·s, for inkjet printers.

In some embodiments, the ink solvent is the same as the hydrophobic colorant carrier. In certain embodiments, the ink solvent is different from the hydrophobic colorant carrier.

Binder resins can be used to promote high dye adhesion on substrates. Some non-limiting examples of the binder resins include aldehyde-ketone resins, epoxy resins, rosin esters, phenolic modified rosin resin, fumaric modified rosin resin, maleic modified rosin resin, hydrogenated rosin resin, dimerized rosin resin, silicon resins, alkyl benzene-sulfonamide resins, vinyl resins, cellulose derivatives, styrene-acrylic resins, acrylic resins, polyurethanes, polyester resins, polyamides, polysiloxane resins, poly(vinyl butyral) resins, aldehyde resins, phenolic resins, etc. In certain embodiments, a combination of two or more binder resins is used in order to provide better balance between the adhesion ability and ink viscosity. In some embodiments, the amount of the binder resins is from 0.1% to 50%, from 0.1% to 40%, from 0.1% to 35%, from 0.5% to 30%, from 1% to 25%, from 2% to 20%, or from 3% to 15% by weight, based on the total weight of the inkjet ink composition.

The inkjet ink composition disclosed herein may contain one or more plasticizers for solubilizing the binder resins. Some non-limiting examples of the plasticizers, depending on the resin used, include diethyl phthalate, di-n-butyl phthalate, diisobutyl phthalate, di-n-hexyl phthalate, bis(2-ethylhexyl) phthalate, diisodecyl phthalate, diisononyl phthalate, 1,2-cyclohexane dicarboxylic acid diisonoyl ester, tri-(2-ethyl hexyl)trimellitate, tri-(n-octyl, n-decyl)trimellitate, tri-(heptyl, nonyl)trimellitate, n-octyl trimellitate, bis(2-ethylhexyl)adipate, etc. In some embodiments, the total amount of the binder resins and the plasticizers is from 0.1% to 50%, from 0.1% to 40%, from 0.1% to 35%, from 0.5% to 30%, from 1% to 25%, from 2% to 20%, or from 3% to 15% by weight, based on the total weight of the inkjet ink composition.

Optional components may be added to the ink formulation to provide extra security of printing marks under any kinds of any physical or chemical trigger, for example fluorescent dye, rare earth elements such that the ink becomes visible under weak UV and IR irradiation. The optional component is generally less than 2%, or from about 0.1% to 1% by weight, based on the total weight of the inkjet ink composition.

The inkjet ink composition disclosed herein may also contain one or more of the following additives: surfactants or surface modifiers, light stabilizers, bactericides, defoaming agents, antioxidants, UV stabilizers, conducting agents, rub resistance agents, and the like. In some embodiments, the total amount of the additives is from 0.1% to 10%, from 0.1% to 8%, from 0.1% to 6%, from 0.1% to 5%, from 0.1% to 4%, from 0.1% to 3%, from 0.1% to 2%, or from 0.1% to 1% by weight, based on the total weight of the inkjet ink composition.

The surface modifiers can be used to regulate the surface tension of inkjet ink. The surface modifiers can be any non-ionic surfactant or ionic surfactant. Some non-limiting examples of the surface modifiers include fluorosurfactants, siloxane-based surfactants, acetylenic diol-based surfactants, hydrocarbon-based surfactants, and combinations thereof. In some embodiments, two or more surface modifiers are used together in order to optimize the jetting stability.

The conducting agent can be used to provide conductivity in ink formulation. The conducting salt can be different from the dyes and is generally selected from the salts of alkali metals, alkaline earth metals and quaternary ammonium. The counter ions of the salts can be selected from halides (chlorides, bromides, iodides, fluorides), perchlorates, nitrates, thiocyanates, formates, acetates, sulfates, propionates, hexafluorophosphates, hexafluoroantimonates and combinations thereof. Some non-limiting examples of the conducting salt can also be ionic liquids such as 1-butyl-3-methylimidazolium tetrafluoroborate, and 1-butyl-3-methylimidazolium hexafluorophosphate.

The inkjet ink composition can be prepared by any suitable method, for example, by mixing all required ingredients at room temperature or upon heating and filtering the ink solution to remove any undesirable materials.

In another embodiment, the inkjet ink composition comprises:
(i) one or more surface colorants in an amount from 3% to 7% by weight;
(ii) one or more hydrophobic colorants in an amount from 1% to 3% by weight;
(iii) one or more hydrophobic colorant carriers in an amount from 5% to 8% by weight;
(iv) one or more ink solvents in an amount from 65% to 80% by weight;
(v) one or more binder resins in an amount from 6% to 9% by weight; and
(vi) one or more additives in an amount from 0.1% to 2% by weight.
All weight % values are based on the total weight of the inkjet ink composition.

In some embodiments, the inkjet ink composition disclosed herein has a viscosity from 2.5 mPa·s to 5 mPa·s and an electrical conductivity greater than 300 µS/cm at 20° C.

In another aspect, provided herein is a method of printing one or more irremovable trace marks on a substrate, wherein the method comprising printing the inkjet ink composition disclosed herein on a single or multi-layered substrate. The trace marks can be in any color or colors including, but not limited to, black, white, red, orange, yellow, green, blue, indigo, violet, gold, silver, metallic color and combinations thereof.

In some embodiments, the substrate comprises one or more polymers or a coating comprising one or more polymers. Some non-limiting examples of polymers include thermoplastics, thermosets and elastomers. In certain embodiments, the substrate is nonporous. In other embodiments, the substrate is pliable or moldable. In certain embodiments, the polymer is selected from the group consisting of polyolefins such as low density poly(ethylene), high density poly(ethylene), and poly(propylene); ethylene-vinyl acetate copolymers; polyethers such as poly(phenyl ether); styrenics polymers such as polystyrene, poly(methyl styrene); polyacrylates such as poly(methyl methacrylate), poly(butyl methacrylate); chlorinated polymers such as poly(vinyl chloride), poly(vinylidene chloride); polycarbonates; epoxy resins and combinations thereof.

The substrate can be in the form of a film, a laminate, a molded article, an extruded article, or a packaging material. The molded article or the extruded article can be selected from toys, grips, soft touch handles, bumper rub strips, floorings, auto floor mats, wheels, casters, furniture and appliance feet, tags, seals, gaskets, automotive doors, bumper fascia, grill components, rocker panels, hoses, linings, office supplies, liners, diaphragms, tubes, lids, stoppers, plunger tips, delivery systems, kitchen wares, shoes, shoe bladders, and shoe soles. The packaging material can be for consumer products such as dairy products, beverages, snacks, food products, plastic bottles, PVC pipes, electrical wirings.

In certain embodiments, the printing with the inkjet ink composition disclosed herein is done by using an inkjet printer such as a continuous inkjet printer in a production line. In some embodiments, the speed of the production line is from about 30 meter/minute to about 50 meter/minute, from about 20 meter/minute to about 60 meter/minute, from about 30 meter/minute to about 50 meter/minute, or from about 35 meter/minute to about 45 meter/minute. In some embodiments, the speed of the production line is at more than 10 meter/minute, more than 20 meter/minute, more than 30 meter/minute, more than 40 meter/minute, or more than 50 meter/minute.

In some embodiments, the method disclosed herein produces on the substrate printed marks comprising a removable top layer and an irremovable bottom layer. In certain embodiments, the method disclosed herein produces on the substrate a double layered print, wherein the double layered print comprises a top print or layer and a bottom print or layer. In further embodiments, the top print or layer is removable from the bottom layer and the bottom print or layer is irremovable from the substrate.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The examples below demonstrate the inkjet ink compositions in accordance with an embodiment of the present invention.

The conductivities of the inkjet ink compositions (Examples 1-4) below were measured by a conductivity meter (obtained from Eutech Instruments, Singapore; model no. Cond6+) using 100 g of the inkjet ink composition in a 100 ml bottle. The conductivity meter was calibrated by a 84 µS/cm standard solution and a 1,413 µS/cm standard solution before the measurement.

The viscosities of the inkjet ink compositions (Examples 1-4) below were measured according to Brookfield Test No.

AATM105Ab using a Brookfield viscometer (obtained from Brookfield Engineering, Middleboro, Mass., USA; model no. DV-II+Pro).

The surface tensions of the inkjet ink compositions (Examples 1-4) below were calculated from the contact angle of the inkjet ink composition by using the OneAttension software (obtained from Biolin Scientific, Stockholm, Sweden). The contact angle of the inkjet ink composition was measured by a contact angle meter (obtained from Biolin Scientific; model no. Attension-Theta Lite optical Tensiometer) using 3-5 μL of the inkjet ink composition hanging from the tip of a micro-syringe.

The color or optical density of trace marks of the inkjet ink composition Examples 1-4 below were directly observed via unaided eye under an inspection site with light illumination at room temperature.

The chemical resistances of the inkjet ink composition Examples 1-4 below were measure according to ASTM D5402 using different aqueous and organic liquids. ASTM D5402 is incorporated herein by reference in its entirety.

Example 1

Example 1 was an inkjet ink composition prepared by mixing 7 g of Solvent black 29 (obtained from Ciba-Geigy, Germany); 2 g of Solvent blue 97 (obtained from Orient, Japan); 8 g of a hydrophobic colorant carrier comprising a mixture of 55 wt. % cyclohexanone, 30 wt. % acetophenone and 15 wt. % quinoline; 14 g of a binder resin comprising a mixture of 25 wt. % rosin esters and 75 wt. % polyurethane resin solution containing 40 wt. % ethanol and 15 wt. % ethyl acetate; 67.5 g of an ink solvent system containing 25 wt. % ethanol, 10 wt. % ethyl acetate and 65 wt. % methyl ethyl ketone; and 1.5 g of additives comprising 70 wt. % sodium hexafluorophosphate and 30 wt. % fluorosurfactant. The mixture was further processed with an IKA homogenizer (obtained from IKA Works GmbH & Co. KG in Staufen, Germany) at room temperature or upon heating, and finally filtering the ink to remove any undesirable materials.

The conductivity, viscosity, surface tension, and the color of trace marks at 24 hours after printing of Example 1 were measured. The formulation and the test results of Example 1 are shown in Table 1 below.

Example 2

Example 2 was an inkjet ink composition prepared by mixing 5 g of Solvent black 29; 1 g of Solvent red 23 (obtained from Rose Color Inc., USA); 6 g of a hydrophobic colorant carrier comprising a mixture of 55 wt. % cyclohexanone, 30 wt. % acetophenone and 15 wt. % quinoline; 16 g of a binder resin comprising a mixture of 25 wt. % rosin esters and 75 wt. % polyurethane resin solution containing 40 wt. % ethanol and 15 wt. % ethyl acetate; 70.5 g of an ink solvent system containing 25 wt. % ethanol, 10 wt. % ethyl acetate and 65 wt. % methyl ethyl ketone; and 1.5 g of additives comprising 70 wt. % sodium hexafluorophosphate and 30 wt. % fluorosurfactant. The ingredients were processed according to the procedure described in Example 1 above to form the inkjet ink composition of Example 2.

The conductivity, viscosity, surface tension, and the color of trace marks at 24 hours after printing of Example 2 were measured. The formulation and the test results of Example 2 are shown in Table 1 below.

Example 3

Example 3 was an inkjet ink composition prepared by mixing 3 g of Pigment black 7; 2.5 g of Solvent blue 97; 1 g of Solvent red 23; 5 g of a hydrophobic colorant carrier comprising a mixture of 55 wt. % cyclohexanone, 30 wt. % acetophenone and 15 wt. % quinoline; 18 g of a binder resin comprising a mixture of 25 wt. % rosin esters and 75 wt. % polyurethane resin solution containing 40 wt. % ethanol and 15 wt. % ethyl acetate; 70 g of an ink solvent system containing 25 wt. % ethanol, 10 wt. % ethyl acetate and 65 wt. % methyl ethyl ketone; and 1.5 g of additives comprising 70 wt. % sodium hexafluorophosphate and 30 wt. % fluorosurfactant. The ingredients were processed according to the procedure described in Example 1 above to form the inkjet ink composition of Example 3.

The conductivity, viscosity, surface tension, and the color of trace marks at 24 hours after printing of Example 3 were measured. The formulation and the test results of Example 3 are shown in Table 1 below.

Example 4

Example 4 was an inkjet ink composition prepared by mixing 4 g of Pigment black 7 (obtained from Clariant, USA); 2 g of Solvent blue 97; 6 g of a hydrophobic colorant carrier comprising a mixture of 55 wt. % cyclohexanone, 30 wt. % acetophenone and 15 wt. % quinoline; 18 g of a binder resin comprising a mixture of 25 wt. % rosin esters and 75 wt. % polyurethane resin solution containing 40 wt. % ethanol and 15 wt. % ethyl acetate; 67 g of an ink solvent system containing 25 wt. % ethanol, 10 wt. % ethyl acetate and 65 wt. % methyl ethyl ketone; and 3 g of additives comprising 70 wt. % sodium hexafluorophosphate and 30 wt. % fluorosurfactant. The ingredients were processed according to the procedure described in Example 1 above to form the inkjet ink composition of Example 4.

The conductivity, viscosity, surface tension, and the color of trace marks at 24 hours after printing of Example 4 were measured. The formulation and the test results of Example 4 are shown in Table 1 below.

TABLE 1

|  | Example 1 | Example 2 | Example 3 | Example 4 |
|---|---|---|---|---|
| Solvent black 29 (g) | 7 | 5 |  |  |
| Pigment black 7 (g)[1] |  |  | 3 | 4 |
| Solvent blue 97 (g) | 2 |  | 2.5 | 2 |
| Solvent red 23 (g) |  | 1 | 1 |  |
| Hydrophobic colorant carrier (g)[2] | 8 | 6 | 5 | 6 |
| Binder resin (g)[3] | 14 | 16 | 18 | 18 |
| Ink solvent system (g)[4] | 67.5 | 70.5 | 70 | 67 |
| Additives (g)[5] | 1.5 | 1.5 | 1.5 | 3 |
| Total (g) | 100 | 100 | 100 | 100 |
| Properties of ink |  |  |  |  |
| Conductivity (μS/cm) at 25° C. | 750 | 550 | 650 | 880 |
| Viscosity (mPa · s) at 25° C. | 3.0 | 3.5 | 4.2 | 4.5 |
| Surface tension (mN/m) at 25° C. | 28.5 ± 0.8 | 27.9 ± 0.9 | 27.5 ± 0.5 | 27.2 ± 0.5 |
| Color of trace marks at 24 hours after printing | Blue | Red | Purple | Blue |

Note:
[1]Pigment black 7 was pre-modified with polyvinyl butyral.
[2]The hydrophobic colorant carrier contained 55 wt. % cyclohexanone, 30 wt. % acetophenone and 15 wt. % quinoline.
[3]The binder resin was a mixture of 25 wt. % rosin esters (obtained from EASTMAN, USA) and 75 wt. % polyurethane resin solution (obtained from DSM U-335, Netherlands) containing 40 wt. % ethanol and 15 wt. % ethyl acetate.
[4]The ink solvent system contained 25 wt. % ethanol, 10 wt. % ethyl acetate and 65 wt. % methyl ethyl ketone.
[5]The additives contained 70% sodium hexafluorophosphate and 30% FC 430 fluorosurfactant (obtained from 3M, USA).

The inkjet ink composition disclosed herein produces irremovable color trace marks on nonporous packaging materials, for example, polyolefins such as polyethylene. The chemical resistance of a trace mark is defined as the trace mark is still clearly visible after rubbing 25 times using either an aqueous or organic liquid. Some non-limiting examples of aqueous liquid include deionized water and liquid detergent. Some non-limiting examples of organic liquids include methanol, ethanol, isopropyl alcohol, acetone, methyl ethyl ketone, tetrahydrofuran, dimethyl sulfoxide, ethyl acetate, chloroform, toluene, hexane, and the like.

A mark such as a pattern or image or information was printed on a single or multi-layered polyethylene or a composite film thereof with an inkjet ink composition disclosed herein using a continuous inkjet printer in a production line at a speed of 40 meter/minute. The printed mark comprised a removable top layer and an irremovable bottom layer. After 24 hours, the top layer of the printed mark was removed with either acetone or ethanol, leaving a trace mark, i.e., the bottom layer. The trace mark was then subjected to chemical resistance test by rubbing the trace marks for 25 times with a cotton rod soaking with various aqueous or organic liquids, as listed in Table 2 below.

Table 2 shows the chemical resistance test results of Examples 1, 2, 3 and 4 respectively. There were no changes in the optical density of the trace marks among all tested samples after rubbing 25 times with either an aqueous or organic liquid.

TABLE 2

Chemical Resistance Test Results of Examples 1-4

| Printed marks | Example 1 (blue trace marks) | Example 2 (red trace marks) | Example 3 (purple trace marks) | Example 4 (blue trace marks) |
|---|---|---|---|---|
| Deionized water | No effect | No effect | No effect | No effect |
| Liquid detergent | No effect | No effect | No effect | No effect |
| 4M Hydrochloric acid solution | No effect | No effect | No effect | No effect |
| 10% Sodium hydroxide solution | No effect | No effect | No effect | No effect |
| Methanol | No effect | No effect | No effect | No effect |
| Ethanol | No effect | No effect | No effect | No effect |
| Isopropyl alcohol | No effect | No effect | No effect | No effect |
| Acetone | No effect | No effect | No effect | No effect |
| Methyl ethyl ketone | No effect | No effect | No effect | No effect |
| Tetrahydrofuran | No effect | No effect | No effect | No effect |
| Dimethyl sulfoxide | No effect | No effect | No effect | No effect |
| Ethyl acetate | No effect | No effect | No effect | No effect |
| Chloroform | No effect | No effect | No effect | No effect |
| Toluene | No effect | No effect | No effect | No effect |
| Hexane | No effect | No effect | No effect | No effect |

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. An inkjet ink composition for printing one or more irremovable color trace marks in the form of a double layered print on a nonporous polymer substrate, wherein the inkjet ink composition comprises a surface colorant, a hydrophobic colorant, a hydrophobic colorant carrier, an ink solvent, a binder, and an additive, wherein the surface colorant is a colorant that stays near or at the surface of a print mark formed by printing with the inkjet ink composition and then drying, wherein the double layered print comprises a top print and a bottom print, wherein a substantial portion of the surface colorant resides in the top print and a substantial portion of the hydrophobic colorant resides in the bottom print, and wherein the hydrophobic colorant has a solubility higher than 0.2 g/100 mL of the hydrophobic colorant carrier.

2. The inkjet ink composition of claim 1, wherein the surface colorant comprises a metal complex dye, a pigment-based colorant or a combination thereof.

3. The inkjet ink composition of claim 2, wherein the surface colorant is present in an amount from 0.1% to 10% by weight, based on the total weight of the inkjet ink composition.

4. The inkjet ink composition of claim 1, wherein the hydrophobic colorant comprises one or more nonionic hydrophobic colorants.

5. The inkjet ink composition of claim 4, wherein the one or more nonionic hydrophobic colorants are selected from the group consisting of anthraquinone-based colorants, azo-based colorants, C.I. solvent dyes, C. I. disperse dyes and combinations thereof.

6. The inkjet ink composition of claim 1, wherein the hydrophobic colorant is in an amount from 0.1% to 10% by weight, based on the total weight of the inkjet ink composition.

7. The inkjet ink composition of claim 1, wherein the hydrophobic colorant carrier comprises one or more organic solvents, and wherein the hydrophobic colorant has a solubility higher than 0.3 g/100 mL or higher than 0.5 g/100 mL of the one or more organic solvents.

8. The inkjet ink composition of claim 1, wherein the hydrophobic colorant carrier comprises one or more organic solvents, wherein the hydrophobic colorant remains soluble in the one or more organic solvents during drying and film forming process, and wherein the hydrophobic colorant stains the nonporous polymer substrate.

9. The inkjet ink composition of claim 8, wherein the one or more organic solvents have a vapor pressure of less than 10 kPa or less than 3 kPa.

10. The inkjet ink composition of claim 1, wherein the hydrophobic colorant carrier is present in an amount from 3% to 30% by weight or from 5% to 15% by weight, based on the total weight of the inkjet ink composition.

11. The inkjet ink composition of claim 9, wherein the one or more organic solvents comprise a mixture of cyclohexanone, acetophenone and quinoline.

12. The inkjet ink composition of claim 1, wherein the ink solvent is selected from the group consisting of ketones, alcohols, esters, and combinations thereof.

13. The inkjet ink composition of claim 12, wherein the ink solvent is a mixture of methyl ethyl ketone, ethanol and ethyl acetate.

14. The inkjet ink composition of claim 1, wherein the ink solvent is present in an amount from 50% to 85% by weight, or from 65% to 80% by weight, based on the total weight of the inkjet ink composition.

15. The inkjet ink composition of claim 7, wherein the hydrophobic colorant comprises a fluorescent dye or a rare earth element for security marking.

16. The inkjet ink composition of claim 1, wherein the binder is present in an amount from 0.1% to 35% by weight, based on the total weight of the inkjet ink composition.

17. The inkjet ink composition of claim 1, wherein the inkjet ink composition further comprises one or more plasticizers for solubilizing the binder, and wherein the additive is selected from the group consisting of surfactants, light stabilizers, defoaming agents, antioxidants, UV stabilizers, bactericides, conducting agents, rub resistance agents, and combinations thereof.

18. The inkjet ink composition of claim 1, wherein the hydrophobic colorant stains the nonporous polymer substrate to form the one or more irremovable color trace marks, and is impervious to any chemical and physical alternations.

19. The inkjet ink composition of claim 1, wherein the nonporous polymer substrate is selected from the group consisting of polyolefins, ethylene-vinyl acetate copolymers, poly(phenyl ether), chlorinated polymers, styrenics polymers; polyacrylates, polycarbonates, epoxy resins, and combinations thereof.

* * * * *